(No Model.)

F. C. ROCKWELL.
PIPE COUPLING.

No. 410,293. Patented Sept. 3, 1889.

Witnesses:
A. F. Langdon
A. B. Jenkins.

Inventor,
Frederick C. Rockwell,
by Harry R. Williams
Attorney.

UNITED STATES PATENT OFFICE.

FREDERICK C. ROCKWELL, OF HARTFORD, CONNECTICUT.

PIPE-COUPLING.

SPECIFICATION forming part of Letters Patent No. 410,293, dated September 3, 1889.

Application filed February 11, 1889. Serial No. 299,411. (No model.)

*To all whom it may concern:*

Be it known that I, FREDERICK C. ROCKWELL, of Hartford, Connecticut, have invented certain new and useful Improvements in Insulating Pipe-Couplings, of which the following is a specification.

My invention relates to the class of couplings adapted to so join the ends of two pipes that electricity cannot pass from one to the other.

The object of the invention is to provide a strong and cheap coupling with the parts that are adapted to be secured to the ends of the pipes completely insulated and held from each other by a solid mass of electrical non-conducting composition, in such manner that should the composition break up or crumble away the parts cannot uncouple.

Figure 1:
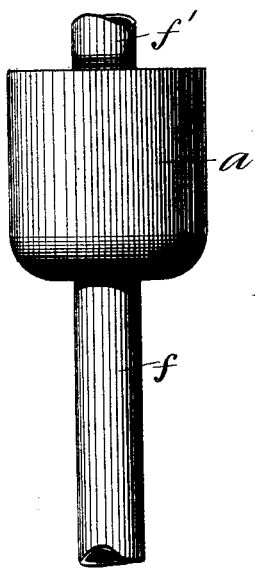
Figure 2:
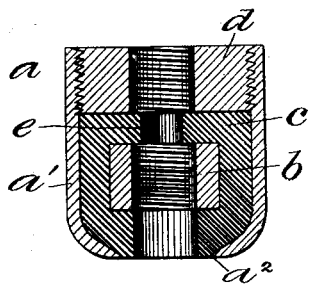
Figure 3:
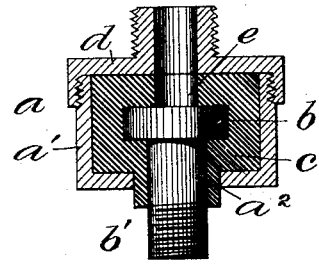

Referring to the accompanying drawings, Figure 1 is a side view of the coupling joining two pipes. Fig. 2 is a central vertical sectional view of the coupling. Fig. 3 is a similar view of a modified form.

The most perfect insulators are formed of compositions of earthy materials and a binding substance supplied with a hardening agent solidified by heat and pressure. These compositions, however, are granular and brittle, and alone are insufficiently strong to bear the strain to which a pipe-coupling supporting a heavy chandelier is subjected without cracking and crumbling away. To utilize this class of effective and easily-molded compositions and prevent their crumbling, also prevent the possibility of the falling of a chandelier should the composition crumble away, I construct the coupling $a$ with an exterior shell $a'$, preferably a metallic tube, open at one end and partly closed at the other. Within this shell, through the open end, is placed a nut $b$, of less diameter than the shell $a'$, but of greater diameter than the opening $a''$ through the end of the shell, and around this nut insulating material is molded, so as to prevent any part of the nut from coming in contact with the shell. This insulating material—which preferably consists of an electric non-conducting earth, as silica or borax, mixed with a binding material. usually a gum, as rubber, and a hardening agent, as sulphur—is packed around the nut in a powdered form or molded in a liquid state and hardened, usually by heat and pressure, forming a solid integral mass which perfectly fits the interior of the shell, preventing any contact between the nut and shell and rigidly holding the nut against rotation, so the threaded end of a pipe $f$ may be screwed into it.

The opening $a''$ through the end of the shell must be sufficiently large to prevent any contact between its edges and the walls of the pipe secured to the nut.

A cap $d$ is secured to the open end of the shell to prevent the loosening or cracking of the insulating composition. This cap, which may either be externally threaded and screwed into the shell or screwed onto the outside of the shell, as in Fig. 3, is provided with a thread for the attachment of a pipe $f'$, which usually is the end of a branch of the gas-piping system of a building.

The opening $e$ made through the insulating composition for the passage of gas is preferably smaller than the opening through the nuts, so as to prevent the pipes from being screwed in so far as to make contact with each other.

If desired, there may be a short section of pipe $b'$ permanently attached to the nut $b$, the outer end of which is threaded to receive the end of the chandelier-tube.

It will be seen that the nut adapted to receive one pipe cannot make contact with the shell of its cap; that the nut is rigidly held against rotation; that the insulating composition cannot be pulled out of the shell without crumbling; that if it should crack and crumble a chandelier hanging from one part would not drop, as the nut $b$ is too large to pass through the opening $a''$, and that there is no chance for an accumulation of matter inside of the coupling, which would make a path for an electric current from one pipe to another.

I claim as my invention—

An insulating pipe-coupling consisting of an exterior shell $a'$, partly closed at one end, containing an integral mass of insulating composition $c$, which surrounds on all faces and firmly holds a parallel-sided nut $b$ of greater diameter than the smaller opening through the shell, and a threaded cap $d$, closing the larger end of the shell, substantially as described, and for the purpose specified.

FREDERICK C. ROCKWELL.

Witnesses:
HARRY R. WILLIAMS,
ARTHUR B. JENKINS.